Figure 1:
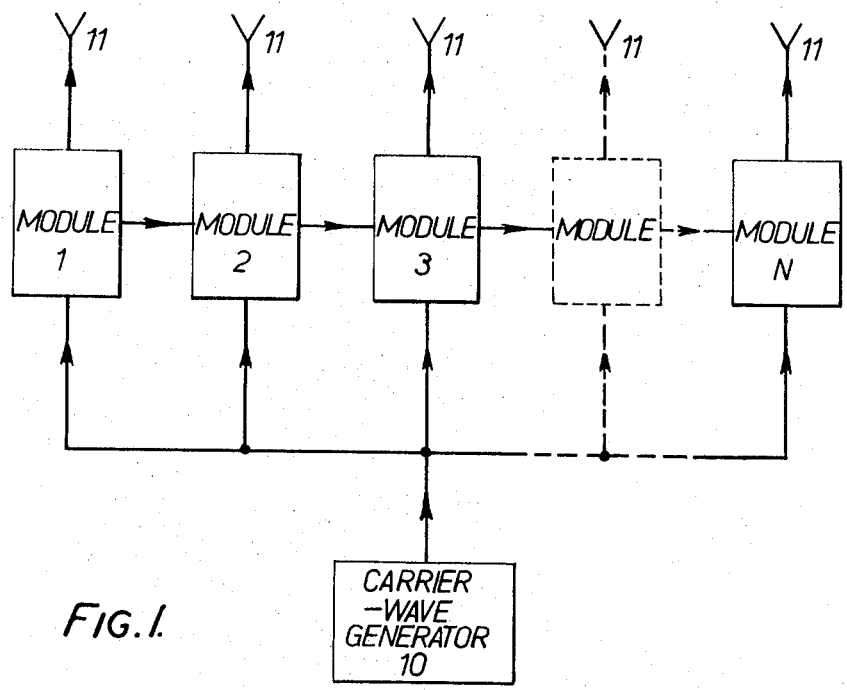

United States Patent [19]
Miller et al.

[11] 3,858,215
[45] Dec. 31, 1974

[54] MICROWAVE TRANSMISSION EMPLOYING TIME STAGGERED FREQUENCY MODULATION AT AN ARRAY OF RADIATORS

[75] Inventors: William Francis Miller; Edward Marshall Wells, both of Great Baddow, England

[73] Assignee: The Marconi Company Limited, Essex, England

[22] Filed: Oct. 10, 1972
(Under Rule 47)

[21] Appl. No.: 295,971

[30] Foreign Application Priority Data
Oct. 8, 1971   Great Britain .................. 46993/71

[52] U.S. Cl. ............................. 343/102, 343/108 R
[51] Int. Cl. .............................................. G01s 1/08
[58] Field of Search ....... 343/106 R, 108 R, 108 M, 343/5 LS, 100 SA, 102

[56] References Cited
UNITED STATES PATENTS

| | | |
|---|---|---|
| 2,403,728 | 7/1946 | Loughren .................... 343/100 SA |
| 2,409,944 | 10/1946 | Loughren .................... 343/100 SA |
| 2,464,276 | 3/1949 | Varian ........................ 343/100 SA |
| 3,202,994 | 8/1965 | Fombonne .................... 343/108 M |
| 3,419,870 | 12/1968 | Wong ............................. 343/771 |
| 3,438,035 | 4/1969 | Fling ........................... 343/100 SA |
| 3,648,285 | 3/1972 | Sanders ........................ 343/106 R |
| 3,680,089 | 7/1972 | Sanders ........................ 343/5 LS |

*Primary Examiner*—Maynard R. Wilbur
*Assistant Examiner*—T. M. Blum
*Attorney, Agent, or Firm*—Baldwin, Wight & Brown

[57] ABSTRACT

A microwave transmission system suitable for use as an aircraft landing system consists of a linear array of radiators each of which radiates the same carrier signal. The carrier signal is modulated with a triangular frequency constant amplitude modulation; the application of the modulation being progressively delayed for the different radiators in the linear array. This produces a radiated pattern consisting of frequency spokes; each spoke having a unique frequency and being radiated in a unique direction. By noting the frequency of a received signal an aircraft can determine its angular position relative to the transmitter.

19 Claims, 5 Drawing Figures

MICROWAVE TRANSMISSION EMPLOYING TIME STAGGERED FREQUENCY MODULATION AT AN ARRAY OF RADIATORS

This invention relates to microwave transmission arrangements and particularly to microwave transmission arrangements which radiate microwave signals the frequency of which depends on the direction of radiation. Arrangements of this kind are particularly applicable to aircraft landing systems in which an aircraft receives ground transmitted microwave signals, and by measuring the frequency or frequencies of the received microwave signals can determine its angular position relative to the transmitter. By transmitting signals the frequencies of which vary both for angles of elevation and angles of azimuth both the bearing and glide path of a landing aircraft can be determined.

Known microwave transmission arrangements of this kind include one vertical array of radiating elements for determining angles of elevation and another horizontal array of radiating elements for determining angles of azimuth. Pulses of predetermined amplitude are applied sequentially and periodically to each of the radiating elements, or to groups of the radiating elements. This causes a line spectrum of frequencies to be radiated, the different frequencies in the line spectrum being radiated in particular predetermined directions. The actual direction is determined by interference between energy radiated by the individual radiating elements. The same effect can be explained in terms of a "Doppler" frequency shift produced by regarding the pulses applied sequentially to the respective radiating elements or groups of elements in the linear array as a moving source of radiation. Thus an aircraft intercepting the microwave signals radiated by this moving source is able to detect a Doppler frequency shift which depends upon the angular direction which the aircraft is making with the array of radiating elements. The Doppler and the interference explanations of this phenomena are equivalent to one another.

Arrangements of this kind suffer from a number of practical drawbacks. In particular in order to restrict the number of different line frequencies to a practical number it is necessary carefully to shape the amplitude profile of each transmitted pulse, a square pulse giving rise in theory to an infinitely large number of line frequencies. Furthermore since each radiating element transmits its pulse for a relatively short period of time it is necessary that the pulse be radiated at a fairly high power level in order to achieve a sufficient overall mean power level. This raises additional complications in the pulse switching networks used. The present invention seeks to provide an improved microwave transmission arrangement in which these difficulties are reduced.

According to this invention a microwave transmission arrangement includes a plurality of microwave radiators in a linear array, means for applying microwave carrier signals to the plurality of microwave radiators, and means for frequency modulating with similar periodic modulations the microwave carrier signal applied to each of the said microwave radiators, the application of the frequency modulation to each microwave radiator being time delayed by a predetermined amount relative to the application of the frequency modulation to an adjacent microwave radiator, whereby the frequency of signals transmitted is a function of the direction of radiation.

Preferably said periodic modulation is a constant amplitude triangular frequency modulation.

The triangular frequency modulation may be such that the frequency changes in value linearly with time for a predetermined period, after which the value reverts to its original frequency or it may be a sawtooth frequency modulation in which the reversal to its original frequency is abrupt.

Preferably said microwave carrier signal is generated at a central point and is routed therefrom to each of the said radiators.

Preferably again a separate means for generating the said periodic triangular frequency modulation is associated with each of the said radiators.

Preferably each radiator is additionally associated individually with means for controlling the phase of the microwave carrier signal radiated therefrom.

Preferably yet again each radiator is associated individually with means for controlling the amplitude of the microwave carrier signal transmitted therefrom.

In general the amplitude of the signal radiated from each radiator will not be the same since it is preferable to taper off the radiated amplitude towards each end of the linear array of radiators.

Preferably, therefore, the amplitude of the signal radiated by each radiator is sampled and the sample compared with a signal representative of a desired amplitude level, and the said means for controlling the amplitude is dependent on the result of the comparison to achieve the said desired amplitude level.

In cases where the microwave carrier signal is routed from a central generator to each radiator it is desirable that a check be made from time to time on the relative phases of the microwave carrier signal radiated from the different radiators.

Preferably, the modulation of the microwave carrier signal is interrupted from time to time, and the phases of the unmodulated microwave carrier signal compared for adjacent pairs of radiators, and the said means for controlling the phase of the microwave carrier signal controlled is dependent on the result of the comparison to reduce any phase difference.

One of the said linear arrays of radiators can be used either in elevation or azimuth, and preferably the microwave transmission arrangement includes two such linear arrays of radiators and feeder arrangements therefor, the one for use in elevation and the other in azimuth. Different microwave carrier signal frequencies are required for the two arrays.

Figure 3:
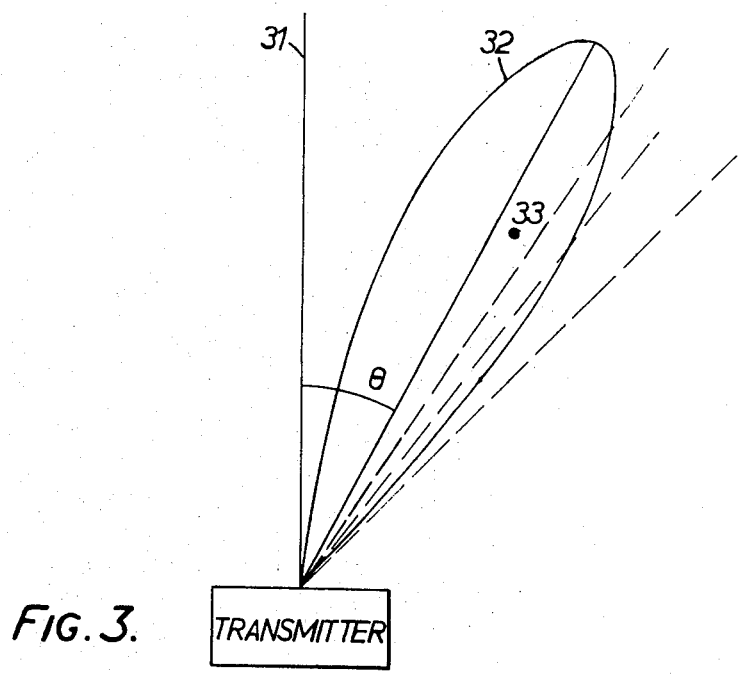
Figure 2:
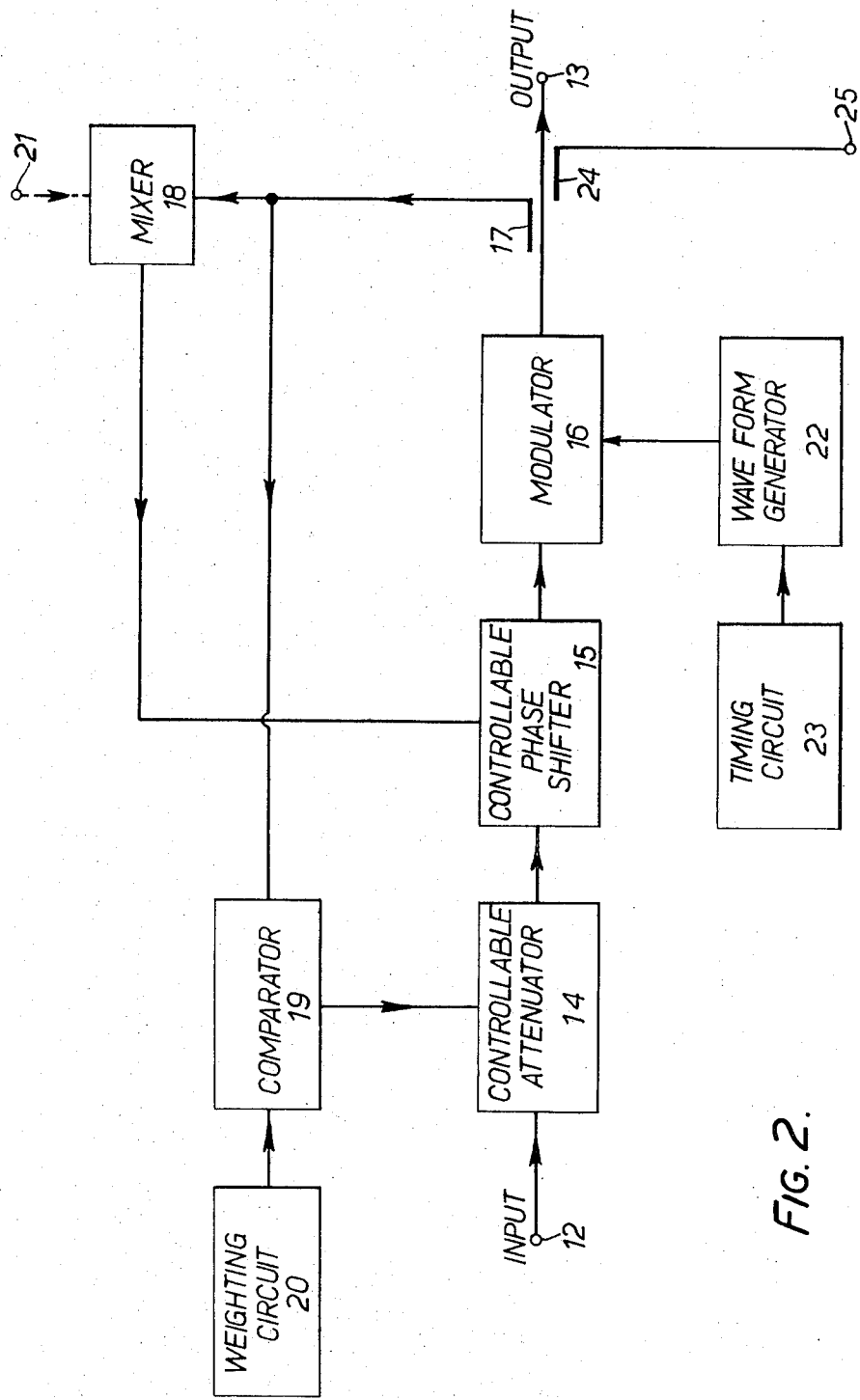
Figure 4:
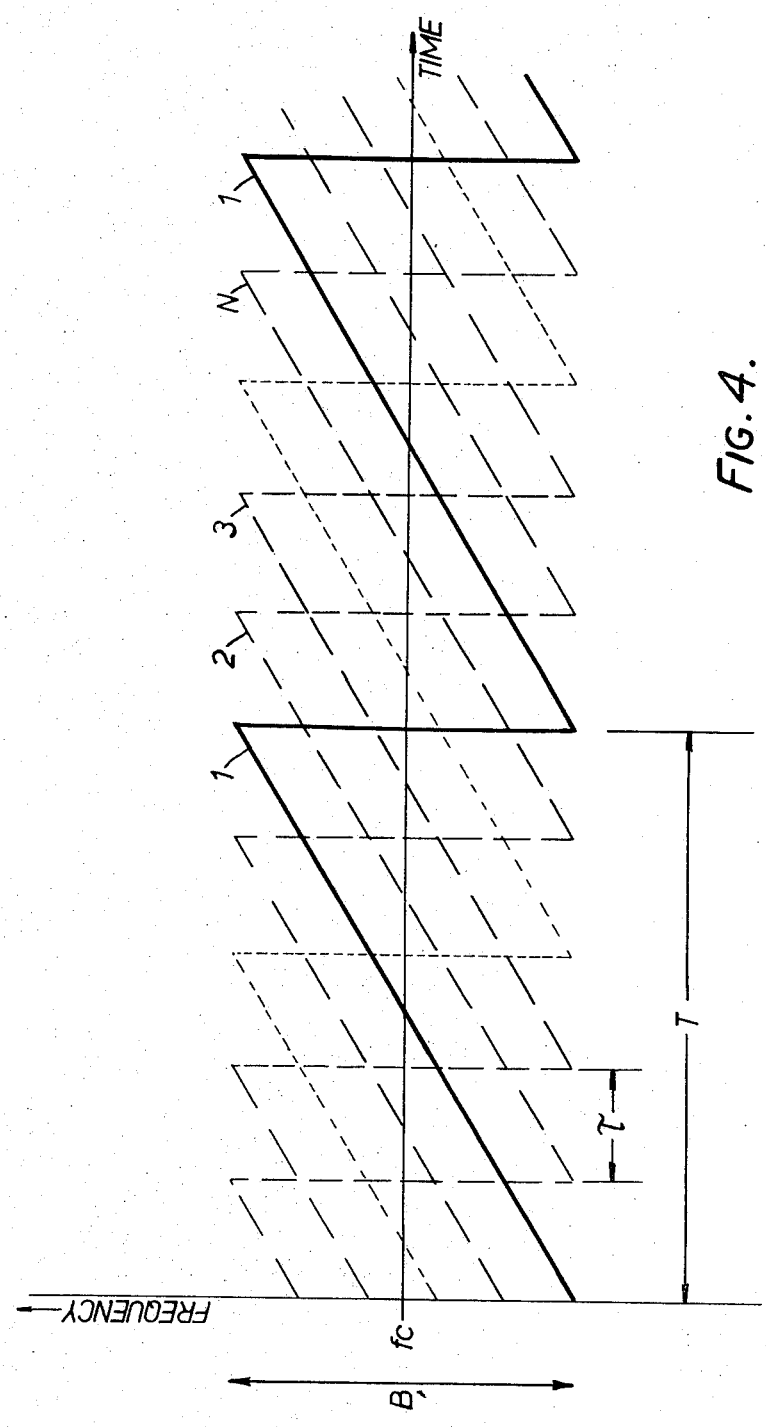
Figure 5:
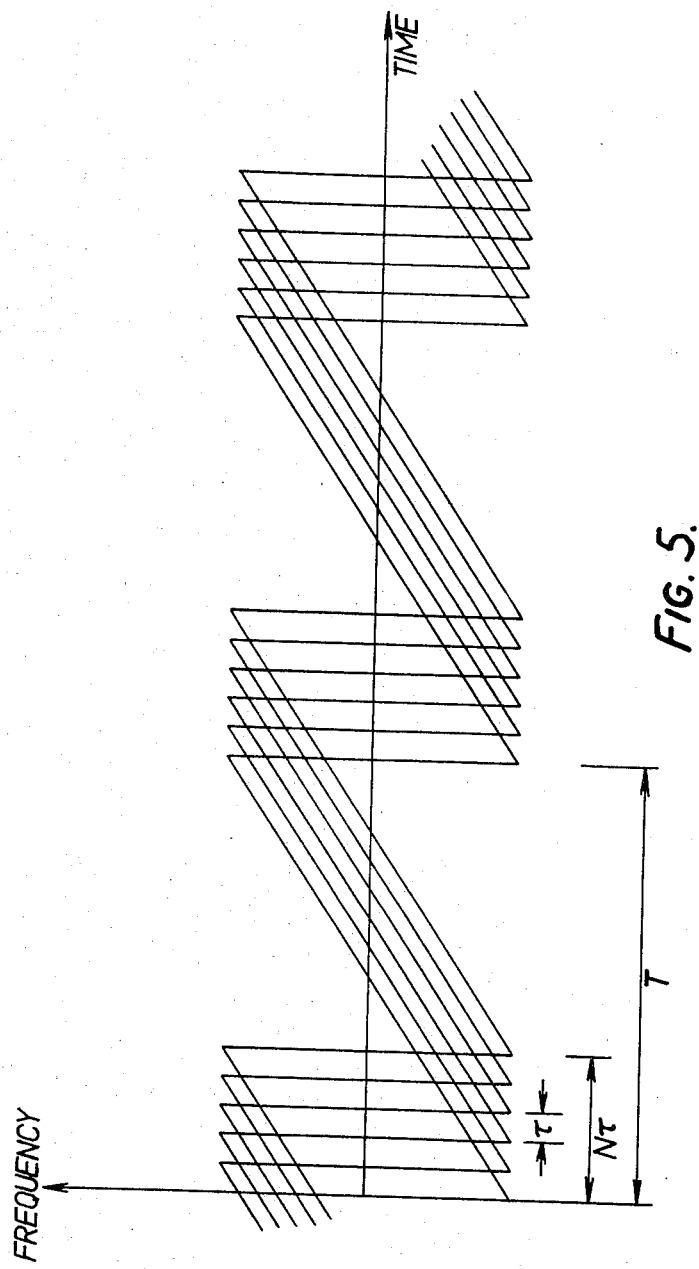

The invention is further described by way of example with reference to the accompanying drawings in which:

FIG. 1 shows a simplified schematic drawing of a microwave transmission arrangement in accordance with this invention, FIG. 2 shows a part of the microwave transmission arrangement in more detail, FIGS. 3 and 4 are explanatory diagrams relating thereto, and FIG. 5 illustrates a modification of the diagram shown in FIG. 4.

Referring to FIG. 1 there is shown therein a microwave carrier wave generator 10 connected to each of a number N of modules referenced 1, 2, 3 .. N. Each module is connected to a respective microwave radiator 11, and each module is connected to the adjacent module for phase comparison purposes.

A module is shown in greater detail in FIG. 2, in which an input terminal 12 is the point to which the carrier wave generator 10 is connected. Connected in series between the terminal 12 and an output terminal 13 is a controllable attenuator 14, a controllable phase shifter 15, and a modulator 16 respectively, in that order. The radiator 11 of FIG. 1 is connected to terminal 13. Between the modulator 16 and the terminal 13 there is provided a coupler 17, which is connected to a mixer 18 and one input of a comparator 19. Another input of the comparator 19 is connected to a weighting circuit 20, and the output of the comparator 19 provides the control link for the controllable attenuator 14. Mixer 18 is also connected to a terminal 21, and has an output connection to the controllable phase shifter 15. Modulator 16 is connected to a wave form generator 22, which in turn is connected to a timing circuit 23. Another coupler 24 is provided adjacent to coupler 17, and is connected to a terminal 25. Terminals 21 and 25 are connected to one each of the two adjacent modules 1, 2, 3 ... N respectively. Each of the modules 1, 2, 3 ... N is as shown in FIG. 2, and they are all identical, except of course that terminal 21 on module 1, and terminal 25 on module N remain unused.

Reference will be made to FIGS. 3 and 4 for an understanding of the operation of the microwave transmission arrangement.

Referring to FIG. 3 there is shown therein, in simplified diagrammatic form, the radiation pattern transmitted by a microwave transmission arrangement in accordance with the present invention. The line 31 represents the direction normal to the direction of the linear array of radiators, and the carrier frequency generated by the carrier wave generator is radiated in the direction of line 31. As the angle $\theta$ increases the transmitted frequency increases progressively in discrete steps, the frequency at a particular angle being radiated in the form of a lobe, for example as shown by the lobe 32. It is assumed that the radiated frequencies increase as angle $\theta$ increases to the right, and decreases as angle $\theta$ increases to the left. The resulting radiation pattern consists of a large number of partially overlapping lobes radiating as "spokes" from the transmitter, each lobe having its own distinctive frequency. Thus an aircraft, say at point 33, intercepts and receives a line spectrum of frequencies, and by noting the relative amplitudes of the frequencies can precisely determine its angular position relative to the transmitter.

In practice two separate lobe patterns would be radiated, one in an elevation plane, and the other in an azimuth plane, to permit an aircraft about to land to completely define both its approach bearing and glide path.

The way in which the microwave transmission arrangement produces the required radiation pattern is as follows. The centrally generated carrier wave generated in generator 10 is modulated in modulator 16 by a constant amplitude sawtooth frequency modulation generated by the waveform generator 22. A sawtooth frequency modulation is shown in FIG. 4 by the solid line referenced 1. This is superimposed on the carrier wave fc and is radiated by radiator 1. Similar waveforms 2, 3 ... N are generated by modules 2, 3 ... N, but being progressively delayed by the time $\tau$. This delay $\tau$ is provided and determined by the timing circuit 23, the corresponding timing circuits in each of the modules being provided with a synchronising reference signal if required.

As a result of these radiated signals, the radiated frequency f is related to the angle $\theta$ by $$f = f_c + f_D$$

and $$f_D = n/T = d/\tau\lambda \sin \theta_n$$

where $d$ is the physical separation between adjacent radiators, $\lambda$ is the wavelength of the carrier frequency $f_c$, $T$ is the period of the sawtooth modulation, $n$ is an integral number 0, 1 ..., and $\tau$ is as already defined. The frequency $f_D$ gives the deviation from the carrier frequency $f_c$.

It will thus be appreciated that $f_c$ is radiated in the normal direction, (i.e., $\theta_n = 0$, $n = 0$), and that for positive values of $\theta_n$ the radiated frequency increases in discrete steps, each step corresponding to a particular value of $n$, and that for negative values of $\theta_n$, the radiated frequency decreases.

The maximum value of $f_D$ is limited by the range $B$ of frequencies in the sawtooth frequency modulation, and in practice $B >> 1/T$.

To improve the shape of each individual lobe, and to reduce unwanted sidelobes it is desirable to impose an amplitude taper on the signals transmitted by the array of radiators, and for this purpose each module is provided with the weighting circuit 20. Weighting circuit 20 presents to the comparator 19 a d.c. voltage which is representative of the required weighting, and comparator 19 compares this voltage with one obtained from the coupler 17, and controls the setting of the controllable attenuator 14 until both inputs to the comparator 19 have equal values.

Since the carrier signal is routed to each module from the carrier wave generator 10, undesired relative phase differences can be introduced between the carrier wave signals radiated by the different radiators. The waveform generator 22 is therefore disconnected from the modulator in each module periodically at suitable intervals of time, and the resulting unmodulated carrier signal is mixed in mixer 18 with the unmodulated carrier signal from the preceding module. Any phase difference is manifest as a signal which controls the controllable phase shifter to reduce any phase difference. In practice only one pair of modules will be phase compared at any instant, and all carrier signals are successively brought into phase with that of module 1. Thus module 2 is compared with module 1, and when its relative phase is correct module 3 is compared with module 2, and so on until finally module N is compared with module N-1.

The microwave transmission arrangement so far described consists of a single linear array of radiators, which can be used to radiate the different frequencies either in elevation or azimuth. Two such linear arrays would be provided to cover both elevation and azimuth, and in this case different carrier frequencies would be used. Typically the carrier frequency $f_c$ might be between 5 GHz and 30 GHz and the spread of the sawtooth frequency modulation $B$ might be several tens of kilohertz. For these values typical values of $T$ and $\tau$ are 2mS and 20$\mu$S and the number of radiators $N$=100.

FIG. 5 illustrates a modification to the waveforms of FIG. 4. Whereas in FIG. 4 the period $T$ equals $N \tau$, in FIG. 5 the period $T$ is much greater than $N\tau$, e.g. typically $T = 100\,N\tau$. The magnitude of $T$ is limited by the required sweep rate of the radiated beams, and typically should not be greater than 0.1 seconds. The modified waveforms give an effectively reduced rate of frequency change for each radiator and this gives rise to a greater number of frequency spokes each having a reduced beam width. This is very advantageous since with the waveforms of FIG. 4 each beam width typically corresponds to an angle of 1° and it may be necessary for an aircraft to interpolate its position to within one-hundredth of a degree using a number of overlapping frequency spokes. By providing a much greater number of narrower spokes this interpolation may be more easily performed and to a greater accuracy.

Since typically $f_D$ is very small relative to $f_c$, if required an unmodulated frequency $f_c$ can be also radiated non-directionally to provide a definite frequency reference for use in the frequency detection aboard the aircraft.

We claim:

1. A microwave transmission arrangement including a plurality of microwave radiators in a linear array, means for applying microwave carrier signals which are substantially in phase to the plurality of microwave radiators, means for frequency modulating with similar periodic modulations the microwave carrier signal applied to each of the said microwave radiators, and means for delaying the application of the frequency modulation to each microwave radiator by a predetermined amount relative to the application of the frequency modulation to an adjacent microwave radiator, whereby the interference pattern set up in space by the radiations of different frequencies emitted by the radiators are in the form of a line spectrum of frequencies, the different frequencies of which are radiated simultaneously in different predetermined directions.

2. An arrangement as claimed in claim 1 wherein said periodic modulation is a constant amplitude triangular frequency modulation.

3. An arrangement as claimed in claim 2 wherein the triangular frequency modulation is such that the frequency changes in value linearly with time for a predetermined period, after which the value reverts to its original frequency.

4. An arrangement as claimed in claim 2 wherein the triangular frequency modulation is a sawtooth frequency modulation in which the reversal to its original frequency is abrupt.

5. An arrangement as claimed in claim 1 wherein said microwave carrier signal is generated at a central point and is routed therefrom to each of the said radiators.

6. An arrangement as claimed in claim 2 wherein a separate means for generating the said periodic triangular frequency modulation is associated with each of the said radiators.

7. An arrangement as claimed in claim 1 wherein the said predetermined amount of delay is the same for each radiator with respect to an adjacent radiator.

8. An arrangement as claimed in claim 7 wherein the application of the frequency modulation to the first radiator in the linear array is delayed relative to the application of the frequency modulation to the last radiator in the linear array by said predetermined amount.

9. An arrangement as claimed in claim 7 wherein the application of the frequency modulation to the first radiator in the linear array is delayed relative to the application of the frequency modulation to the last radiator in the linear array by an amount much greater than said predetermined amount.

10. An arrangement as claimed in claim 2 wherein the frequency spectrum of each triangular frequency modulation applied to the different radiators is the same.

11. An arrangement as claimed in claim 1 wherein each radiator is additionally associated individually with means for controlling the phase of the microwave carrier signal radiated therefrom.

12. An arrangement as claimed in claim 11 wherein each radiator is associated individually with means for controlling the amplitude of the microwave carrier signal transmitted therefrom.

13. An arrangement as claimed in claim 12 wherein the amplitude of the signal radiated by each radiator is sampled and the sample compared with a signal representative of a desired amplitude level, and the said means for controlling the amplitude is dependent on the result of the comparison to achieve the said desired amplitude level.

14. An arrangement as claimed in claim 1 including two linear arrays of radiators and feeder arrangements therefor, the one for use in elevation and the other in azimuth.

15. A microwave transmission arrangement comprising, in combination:

a plurality of microwave radiators arranged in a linear array so as to provide a boresight normal to said array;

means for continuously applying a frequency modulated microwave carrier signal to each radiator of said array, the frequency modulation of said carrier signal being of uniform periodic nature;

means for maintaining the carrier signals at each array substantially in phase; and means causing the application of said frequency modulated microwave carrier signal to be staggered in time at successive radiators of said array for setting up an interference pattern in space in which different frequencies are radiated simultaneously in different angular directions with respect to said boresight whereby the frequency spectrum of radiation received remote from said array is a function of the disposition of the point of reception with respect to said boresight.

16. A microwave transmission arrangement as defined in claim 15 wherein the frequency modulation of said carrier signal is a constant amplitude triangular frequency modulation and the time staggering is uniform from element-to-element of said array.

17. A microwave transmission arrangement as defined in claim 15 wherein the period of said triangular frequency modulation is $Nt$ where $N$ is the number of radiators of said array and $t$ is the period of time staggering between successive radiators.

18. A microwave transmission arrangement as defined in claim 16 wherein the period of said triangular frequency modulation is much greater than $Nt$ where $N$ is the number of radiators of said array and $t$ is the period of time staggering between successive radiators.

19. A microwave transmission system comprising, in combination:

a plurality of microwave radiators arranged in a linear array;

a transmitting module associated with each radiator, each module including frequency modulator means connected to its associated radiator for applying a frequency modulated carrier signal thereto, waveform generator means connected to said frequency modulator means for causing said carrier signal to be sawtooth modulated, and timing means connected to said waveform generator means for controlling the timing of said sawtooth modulation at said associated radiator relative to the sawtooth modulations at the remaining radiators of the array, the plurality of timing means associated with the plurality of radiators of the array causing said frequency modulations to occur in uniformly time staggered relation along said array; and means for providing in phase carrier signal inputs to all of said frequency modulator means whereby said array sets up an interference pattern in space in which different frequencies are radiated simultaneously in different predetermined directions.

* * * * *